US010349219B2

(12) United States Patent
Cordova et al.

(10) Patent No.: US 10,349,219 B2
(45) Date of Patent: Jul. 9, 2019

(54) METHODS AND SYSTEMS FOR COMBINING SENSOR DATA TO DETERMINE VEHICLE MOVEMENT INFORMATION

(71) Applicant: TRUEMOTION, INC., Boston, MA (US)

(72) Inventors: Brad Cordova, Cambridge, MA (US); Sanujit Sahoo, Cambridge, MA (US); Nicholas Arcolano, Cambridge, MA (US)

(73) Assignee: TRUEMOTION, INC., Boston, MA (US)

( * ) Notice: Subject to any disclaimer, the term of this patent is extended or adjusted under 35 U.S.C. 154(b) by 89 days.

(21) Appl. No.: 15/416,852

(22) Filed: Jan. 26, 2017

(65) Prior Publication Data

US 2017/0211939 A1 Jul. 27, 2017

Related U.S. Application Data

(60) Provisional application No. 62/287,262, filed on Jan. 26, 2016.

(51) Int. Cl.
*H04W 4/02* (2018.01)
*G01C 21/16* (2006.01)
*G01C 21/28* (2006.01)
*H04W 4/029* (2018.01)
*G01S 19/40* (2010.01)
*G01S 19/52* (2010.01)

(52) U.S. Cl.
CPC .......... *H04W 4/027* (2013.01); *G01C 21/165* (2013.01); *G01C 21/28* (2013.01); *H04W 4/029* (2018.02); *G01S 19/40* (2013.01); *G01S 19/52* (2013.01)

(58) Field of Classification Search
CPC .... H04W 4/027; H04W 4/029; G01C 21/165; G01C 21/28
USPC ....................................................... 701/509
See application file for complete search history.

(56) References Cited

U.S. PATENT DOCUMENTS

| 8,150,624 B2* | 4/2012 | Berardi ................. A61B 5/1112 701/472 |
| 2010/0131304 A1* | 5/2010 | Collopy ............. G06Q 30/0224 705/4 |
| 2014/0121963 A1* | 5/2014 | Buck ...................... G01C 21/16 701/501 |

* cited by examiner

*Primary Examiner* — Thomas G Black
*Assistant Examiner* — Luat T Huynh
(74) *Attorney, Agent, or Firm* — Kilpatrick Townsend & Stockton LLP

(57) ABSTRACT

According to some embodiments of the invention, movement measurements may be obtained from a movement sensor (e.g., an accelerometer) of a mobile device in a vehicle. In addition, location measurements may be obtained from a location sensor (e.g., a GPS) of the mobile device in the vehicle. The movement measurements and the location measurements may be cross-referenced to each other to remove erroneous measurements, such as physically impossible measurements. The remaining measurements may be used to draw conclusions about the movements or locations, such as to identify a movement event (e.g., a braking event, an acceleration event, or the like).

18 Claims, 7 Drawing Sheets

FIG. 4

Table T1

| TIME 450A | EVENT 452A | PROCESS 455A | PROCESS 455B | PROCESS 455C |
|---|---|---|---|---|
| 1 | | | | |
| 2 | B | | | |
| 3 | | X | | |
| 4 | B | X | | |
| 5 | B | X | | |
| 6 | B | | | |
| 7 | | | | |
| 8 | | X | | |
| 9 | | X | | |
| 10 | | X | | |
| 11 | | | | |
| 12 | B | X | | |
| 13 | | | | |
| 14 | | | | |
| 15 | | | | X |
| 16 | | | | X |
| 17 | B | | | |
| 18 | | | | |
| 19 | | | | |
| 20 | B | | | X |
| 21 | B | | | X |
| 22 | | | | |
| 23 | | X | | |
| 24 | | X | | |
| 25 | | | | |

GROUPS 490A: G1, G2, G3, G4, G5, G6

Table T2

| TIME 450B | GROUPS 490B | EVENT 452B |
|---|---|---|
| 1 | G1 | B |
| 2 | | B |
| 7 | G2 | |
| 8 | | |
| 9 | | |
| 13 | G3 | B |
| 15 | | |
| 16 | G4 | |
| 17 | | |
| 18 | | |
| 19 | | |
| 22 | G5 | B |
| 25 | G6 | |

METHODS AND SYSTEMS FOR COMBINING SENSOR DATA TO DETERMINE VEHICLE MOVEMENT INFORMATION

CROSS-REFERENCES TO RELATED APPLICATIONS

This application claims the benefit of U.S. Provisional Patent Application No. 62/287,262, entitled "METHODS AND SYSTEMS FOR COMBINING SENSOR DATA TO DETERMINE VEHICLE MOVEMENT INFORMATION", filed Jan. 26, 2016, the content of which is hereby incorporated by reference in its entirety.

BACKGROUND OF THE INVENTION

Mobile devices, including smart phones, have been utilized to provide location information to users. Mobile devices can use a number of different techniques to produce location data. One example is the use of Global Positioning System (GPS) chipsets, which are now widely available, to produce location information for a mobile device. Some systems have been developed to track driving behaviors including speed, braking, and turn speed. Such systems include external devices that have been physically integrated with vehicles to track driving behavior.

SUMMARY OF THE INVENTION

Despite the progress made in relation to collecting data related to drivers and their driving behavior, there is a need in the art for improved systems and methods related to combining sensor data to determine vehicle movement information.

According to some embodiments of the invention, movement measurements may be obtained from a movement sensor of a mobile device in a vehicle. In addition, location measurements may be obtained from a location sensor of the mobile device in the vehicle. The movement measurements and the location measurements may be cross-referenced to each other to remove erroneous measurements, such as physically impossible measurements. The remaining measurements may be used to draw conclusions about the movements or locations, such as to identify a movement event (e.g., a braking event, an acceleration event, etc.).

According to some embodiments of the invention, a method of determining movement events for a vehicle is provided. The method comprises obtaining a plurality of movement measurements from a movement sensor of a mobile device disposed in a vehicle. The method further comprises obtaining a plurality of location measurements from a location sensor of the mobile device disposed in the vehicle. The method further comprises verifying the plurality of movement measurements using the plurality of location measurements. The method further comprises removing one or more movement measurements from the plurality of movement measurements using the plurality of location measurements to provide a set of remaining movement measurements. The method further comprises determining a movement event for the vehicle using the remaining movement measurements.

According to some embodiments of the invention, a device is provided. The device comprises a memory. The device further comprises a processor. The processor is configured to perform operations including the steps of the above method.

According to some embodiments, a computer-program product is provided. The computer-program product is tangibly embodied in a non-transitory machine-readable storage medium of a device. The computer-program product includes instructions that, when executed by one or more processors, cause the one or more processors to perform operations including the steps of the above method.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 4 is a table illustrating exemplary movement measurements according to an embodiment of the invention.

DETAILED DESCRIPTION OF SPECIFIC EMBODIMENTS

Figure 1:
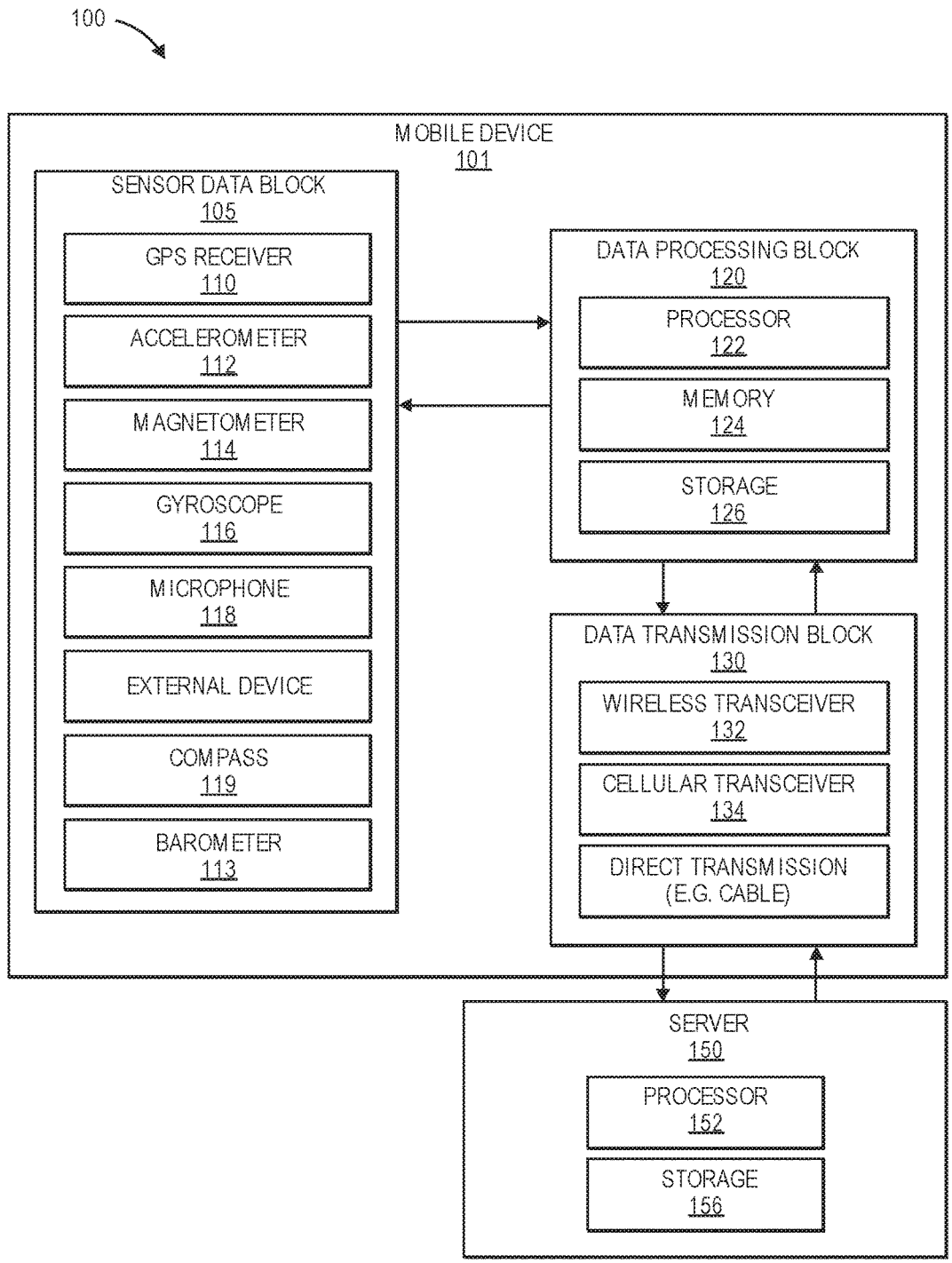
FIG. 1 is a system diagram illustrating a mobile device according to an embodiment of the invention.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As discussed below, some embodiments described herein use approaches to collecting and analyzing driving data similar to the approaches described in U.S. patent application Ser. No. 15/149,603, filed May 9, 2016, entitled "METHODS AND SYSTEMS FOR SENSOR-BASED VEHICLE ACCELERATION DETERMINATION," (the '603 Application), U.S. patent application Ser. No. 15/149,613, filed May 9, 2016, entitled "METHODS AND SYSTEMS FOR DRIVING DATA COLLECTION" (the '613 Application), U.S. patent application Ser. No. 14/749,232, filed Jun. 24, 2015, entitled "METHODS AND SYSTEMS FOR ALIGNING A MOBILE DEVICE TO A VEHICLE" (the '232 Application), and U.S. Provisional patent application. Ser. No. 15/249,967, filed Aug. 29, 2016, entitled "METHODS AND SYSTEMS FOR PRESENTING COLLECTED DRIVING DATA," (the '967 Application) ("the Incorporated Applications"). These applications are incorporated by reference herein in their entirety for all purposes.

Specific examples of the use of different embodiments disclosed in these applications ("the Incorporated Applications") are provided herein, and one having skill in the relevant art(s), will appreciate how additional approaches described in these applications can be used by some embodiments described herein.

FIG. 1 is a system diagram illustrating a system 100 for collecting driving data according to an embodiment of the present invention. System 100 may include a mobile device 101 having a number of different components. Mobile device 101 may include a sensor data block 105, a data processing block 120, and a data transmission block 130. The sensor data block 105 may include data collection sensors as well as data collected from these sensors that are available to mobile device 101. This can include external devices connected via Bluetooth, USB cable, etc. The data processing block 120 may include storage 126 for manipulations done to the data obtained from the sensor data block 105 by processor 122 and memory 124 coupled to the processor 122. This may include, but is not limited to, analyzing, characterizing, subsampling, filtering, reformatting, etc. Data transmission block 130 may include any transmission of the data off the phone to an external computing device that can also store and manipulate the data obtained from sensor data block 105, such as by using a wireless transceiver 132 a cellular transceiver 134, and/or direct transmission (e.g., through a cable or other wired connection). The external computing device can be, for example, a server 150. Server 150 can comprise its own processor 152 and storage 156.

Some embodiments of the present invention are described using examples where driving data is collected using a mobile device 101, and these examples are not limited to any particular mobile device. As examples, a variety of mobile devices including sensors such as GPS receivers 110, accelerometers 112, gyroscopes 116, magnetometers 114, microphones 118, compasses 119, barometers 113, location determination systems such as global positioning system (GPS) receivers 110, communications capabilities, and the like are included within the scope of some embodiments. Exemplary mobile devices include smart watches, wearable devices, fitness monitors, Bluetooth headsets, tablets, laptop computers, smart phones, music players, movement analysis devices, and other suitable devices. One of ordinary skill in the art, given the description herein, would recognize many variations, modifications, and alternatives for the implementation of embodiments.

To collect data associated with the driving behavior of a driver, one or more sensors on mobile device 101 (e.g., the sensors of sensor data block 105) may be operated close in time to a period when mobile device 101 is with the driver when operating a vehicle—also termed herein "a drive" or "a trip". With many mobile devices 101, the sensors used to collect data are components of the mobile device 101, and use power resources available to mobile device 101 components, e.g., mobile device battery power and/or a power source external to mobile device 101.

Some embodiments use settings of a mobile device to enable different functions described herein. For example, in Apple iOS, and/or Android OS, having certain settings enabled can enable certain functions of embodiments. For some embodiments, having location services enabled allows the collection of location information from the mobile device (e.g., collected by global positioning system (GPS) sensors), and enabling background app refresh allows some embodiments to execute in the background, collecting and analyzing driving data even when the application is not executing.

Figure 2:
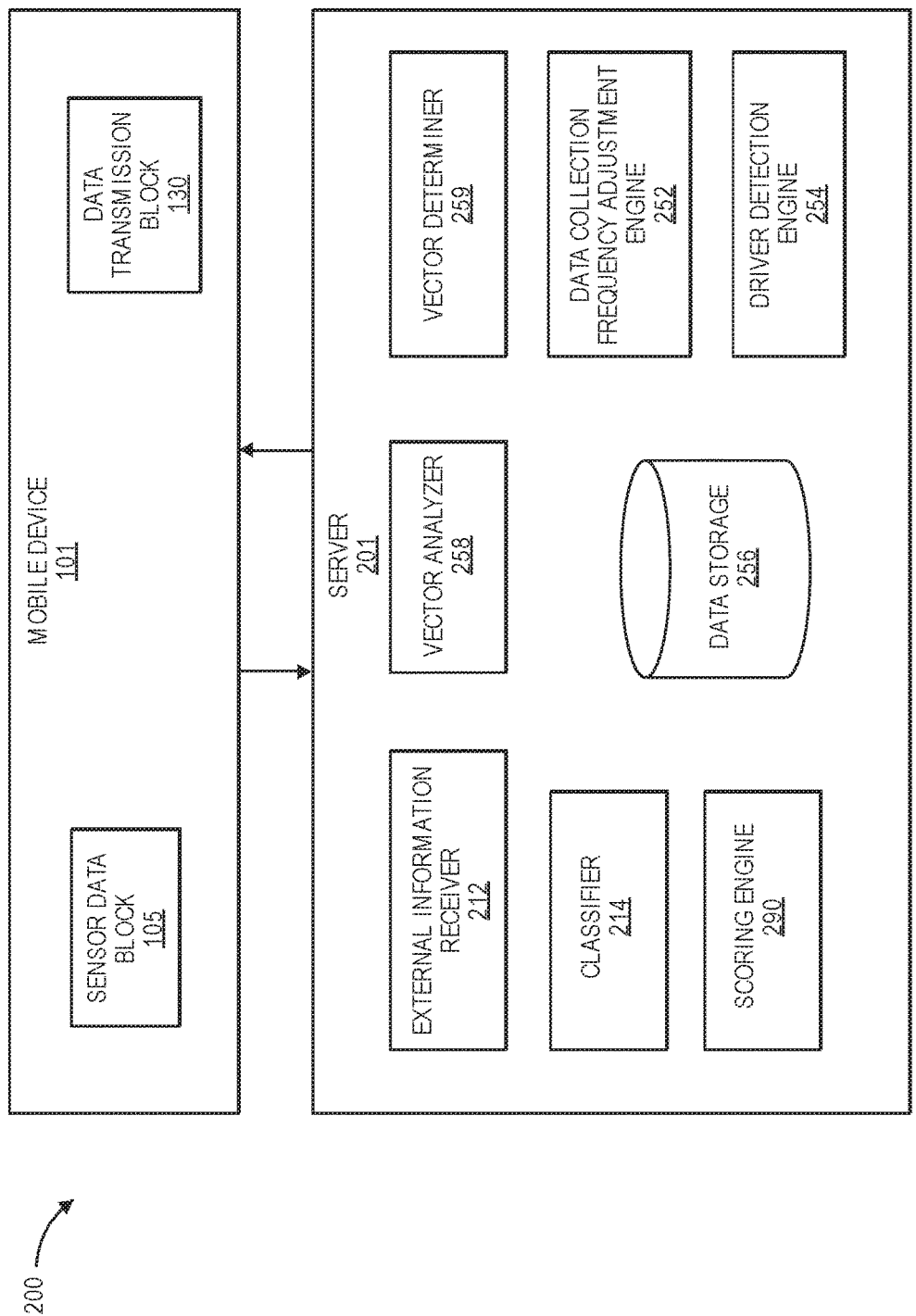
FIG. 2 is a system diagram illustrating a server according to an embodiment of the invention.

FIG. 2 shows a system 200 for collecting driving data that can include a server 201 that communicates with mobile device 101. In some embodiments, server 201 may provide functionality using components including, but not limited to vector analyzer 258, vector determiner 259, external information receiver 212, classifier 214, data collection frequency engine 252, driver detection engine 254, and scoring engine 290. These components are executed by processors (not shown) in conjunction with memory (not shown). Server 201 may also include data storage 256. It is important to note that, while not shown, one or more of the components shown operating within server 201 can operate fully or partially within mobile device 101, and vice versa.

To collect data associated with the driving behavior of a driver, one or more sensors on mobile device 101 (e.g., the sensors of sensor data block 105) may be operated close in time to a period when mobile device 101 is with the driver when operating a vehicle—also termed herein "a drive" or "a trip". Once the mobile device sensors have collected data (and/or in real time), some embodiments analyze the data to determine acceleration vectors for the vehicle, as well as different features of the drive. Exemplary processes detect and classify driving features using classifier 214, and determine acceleration vectors using vector analyzer 258 and vector determiner 259. In some embodiments, external data (e.g., weather) can be retrieved and correlated with collected driving data.

As discussed herein, some embodiments can transform collected sensor data (e.g., driving data collected using sensor data block 105) into different results to analyze movement measurements and to detect the occurrence of driving events. Although shown and described as being contained within server 201, it is contemplated that any or all of the components of server 201 may instead be implemented within mobile device 101, and vice versa. It is further contemplated that any or all of the functionalities described herein may be performed during a drive, in real time, or after a drive.

Figure 3:
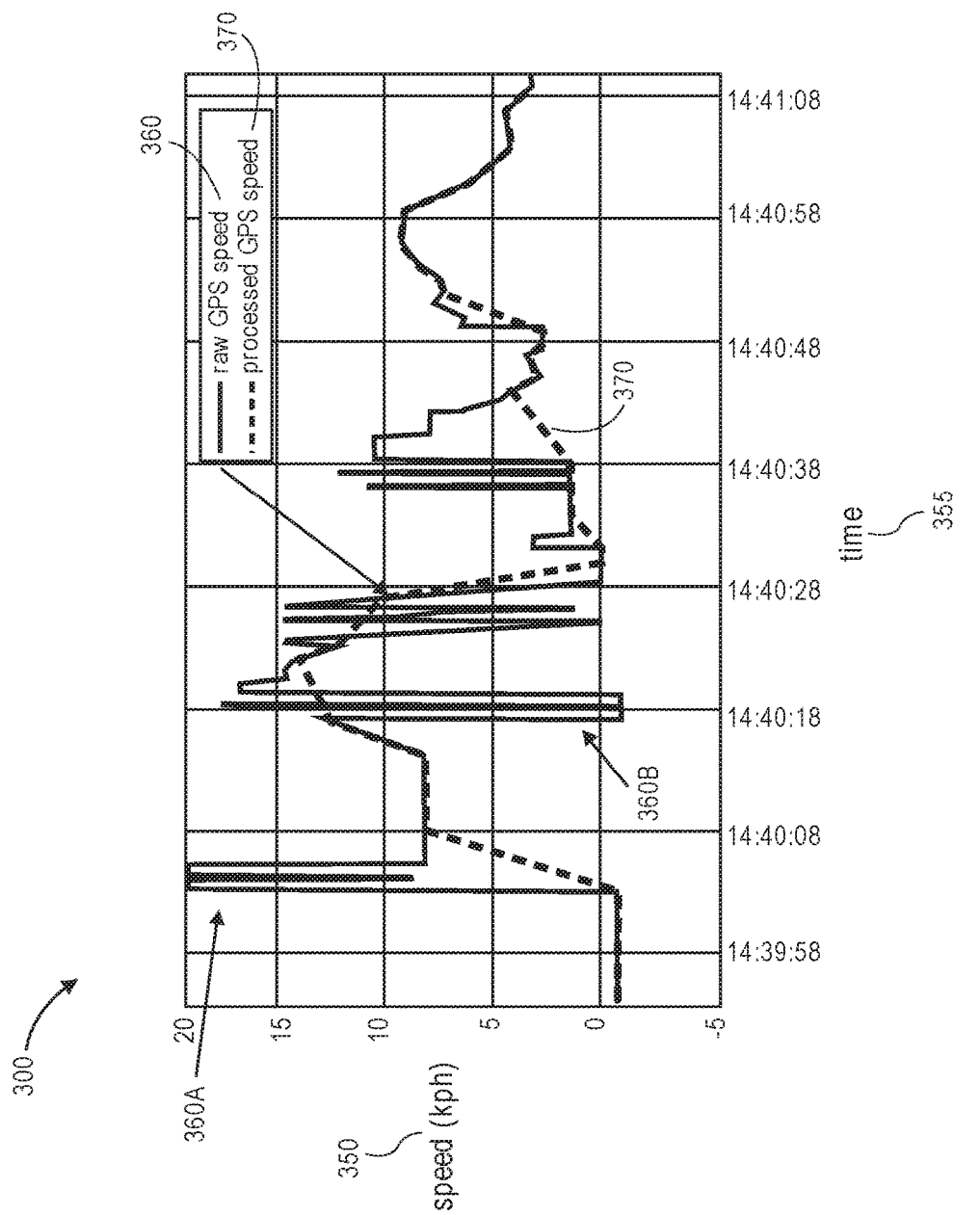
FIG. 3 is a plot illustrating raw and processed speed measurements according to an embodiment of the invention.

FIG. 3 is a chart 300 showing a plot of collected "raw" speed 250 measurements 260 of a vehicle over a period of time 255, and a plot of speed measurements over time after the measurements have been processed 270. Some examples of processing different collected values are discussed below with respect to FIGS. 4-7. It should be noted that FIG. 3 is an example of results from some embodiments, and that other results may occur.

In some embodiments, one of the movement measurements collected by a mobile device (e.g., by GPS receiver 110 of mobile device 101 of FIG. 1) is the speed of a vehicle as determined from a speed source, e.g., GPS measurements. However, it is contemplated that GPS measurements may provide erroneous data. Some embodiments use one or more of the following approaches to remove erroneous speed data from a data set.

The raw GPS speed includes spikes 260A and 260B that may indicate large accelerations 260A or decelerations 260B. The processing of the GPS data removes these deviation events providing the smoothed profile illustrated by curve 270. Examples of erroneous GPS data that may be collected is provided below.

GPS Signal Inaccuracy:

Some GPS receivers provide a level of accuracy for provided GPS measurements. In some embodiments, a threshold can be applied to these measurements, and those with a confidence level below a threshold can be removed from a data set of measurements.

Time Duplicates:

Some GPS receivers can provide erroneous data in the form of multiple GPS measurements for the same time value, e.g., 20 mph measured at 5:01 minutes, and 5 mph received for the same time. In some embodiments, a stream of location measurements can be analyzed for multiple values of this type, and either all of the duplicate values can be removed or one of the values can be selected to be removed using some approach, e.g., the value closest to the previous time value, the point closest to the center of the cluster, the point closest to a previously measured point that is outside the cluster, and/or the like.

Clusters of Points Over a Small Duration of Time:

Some GPS receivers can provide erroneous data that is a cluster of points in a small duration of time. In some embodiments, a stream of location measurements can be analyzed for this problem, e.g., by measuring the distance between points and comparing to the amount of time between the measurements. When these clusters are detected, either all the duplicate values can be removed or one of the values can be selected using some approach, e.g., the point closest to the center of the cluster, the point closest to a previously measured point that is outside the cluster, and/or the like.

Speed and/or Time Measurements Beyond Physics:

Some GPS receivers can provide erroneous data that are points that are impossible based on the characteristics of vehicle movement and the laws of physics. In some embodiments, a stream of location measurements can be analyzed for this problem, e.g., by comparing points and applying rules to detect physically impossible measurements. For example, a measurement of 20 mph followed seconds later by two 4 mph measurements, then a measurement of 15 mph a second later may be physically impossible. When these types of measurements are detected, either all the values can be removed or one of the values can be selected using some approach.

GPS "Sticky" Values:

Some GPS receivers can provide erroneous data that are a series of repeated ("sticky") values over a small duration of time. In some embodiments, a stream of location measurements can be analyzed for this problem, e.g., by looking for sets of repeated values, and applying thresholds to determine when repeated values are potentially erroneous. When these repeated values are detected, either all the duplicate values can be removed or one of the values can be selected using some approach, e.g., the point closest to the center of the cluster, the point closest to a previously measured point that is outside the cluster, and/or the like.

FIG. 4 is a table that shows exemplary movement measurements collected over time 450A. The column shown with event 452A has a "B" to indicate that an example event has been detected based on the time 450A data collected. In some embodiments, the occurrence of certain events (e.g., hard braking, hard turning, speeding, using a phone while driving, and/or the like) is indicative of driving behavior by a driver that is relevant to a risk model for the driver. Based on an analysis of diving data with respect to certain events, events can give an indication of driver ability in these areas. As discussed in the Incorporated Applications, in some embodiments, a driver score is determined, for example, by the scoring engine 290, based on analyzing detected events.

It should be appreciated that the example events shown in FIG. 4 have been simplified to demonstrate processing performed by some embodiments, for example, some embodiments use multiple measurements collected over a range of times to detect events. As an illustration of this, when viewing table T1, time 450A rows can be interpreted as multiple measurements over a range of time, not just a single measurement.

In this example, without processing to detect potentially erroneous measurements, nine braking events (B) would be reported for the time 450A time range 1-25, e.g., 2, 4, 5, 6, 8, 12, 17, 20 and 21 listed in event 452A. In example embodiments, as shown by an "X" one of more of processes 455A-455C are applied to estimate that certain data points over time 450A are erroneous. For example, process 455A detects, over time 450A, potential errors at 3, 4, 5, 10, 11, 12, 23, and 24.

In some embodiments, processes 455A-455C are one or more of the approaches used to remove erroneous data described above with FIG. 3. It should be noted that additional approaches can be used by embodiments, as well as that the number of approaches applied can exceed the example shown in FIG. 4.

In some embodiments, measurements collected can be combined into groups based on the application of one or more processes 455A-455C. As shown in FIG. 4, some embodiments can create groups based on the use of data points not determined by processes 455A-455C as potentially erroneous. As shown in FIG. 4, based on using processes 455A-455C and the exclusion of measurements marked as potentially erroneous ("X"), six groups of measurements are created—groups 490A values G1-G6. Thus, as shown in table T2, instead of the nine "B" events, the groups 490B result in three events 452B (time 450B values 2, 8 and 17).

Figure 5A:
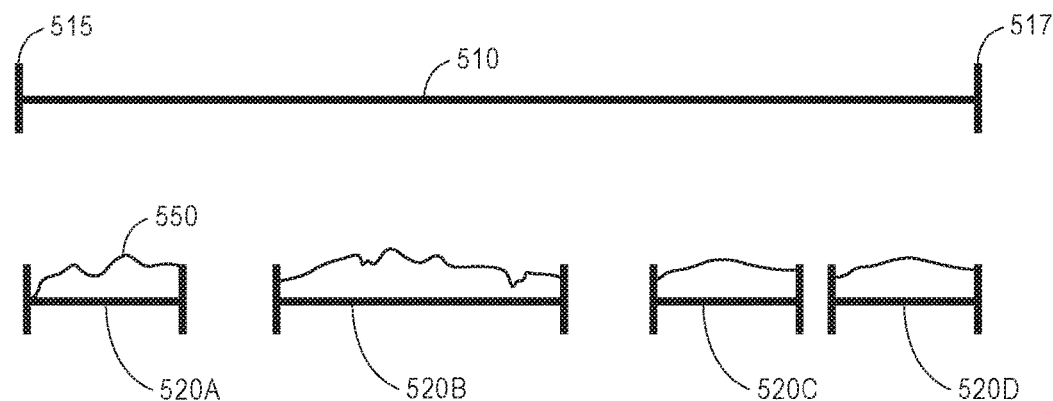
FIGS. 5A-5C are graphs illustrating transformations o data resulting from the processes of FIG. 4 according to an embodiment of the invention.
Figure 5B:
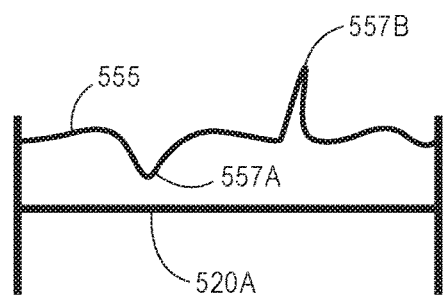
Figure 5C:
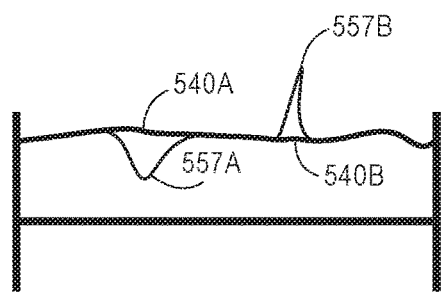

FIGS. 5A-5C show how the data in groups (e.g., G1-G6) resulting from the processes of FIG. 4 can be further transformed by some embodiments. For example, once grouped, the measurement data collected can be processed and additional results can be determined. For example, multiple speed measurements can be analyzed and transformed into acceleration values. In FIG. 5A, collected measurements 510 (starting at time 515 and ending at time 517) can be grouped by the processes described in FIG. 4 into groups 520A-520D. In some embodiments, graph line 550 of group 520A (and similar lines shown for groups 520B-520D), represent acceleration values determined from the measurements 510, after processing by the approaches shown in FIG. 4.

FIG. 5B is a more detailed view of group 520A, with a graph line 555 having points 557A and 557B. In some embodiments, the determined values in group 520A (e.g., acceleration values) can be analyzed and potentially erroneous values can be removed. One having skill in the relevant art(s), given the description herein, will appreciate that different approaches can be used by embodiments to detect potentially erroneous values. The approach shown in FIGS. 5B and 5C marks data in group 520A as potentially erroneous if the change in value exceeds a threshold. Applying a threshold, points 557A and 557B are marked as potentially erroneous by the approach.

Once marked as erroneous by the process of FIG. 5B, in FIG. 5C, different approaches can be used to remove and/or replace values marked as erroneous. For example, in FIG. 5C, lines 540A and 540B show how a smoothing function can be applied by some embodiments to replace points 557A-557B.

It should be appreciated that, by applying the two-stage analysis described in FIGS. 4 and 5A-5C, some embodiments can improve the performance of a computer system processing collected movement measurement data, and improve the data produced by movement sensors.

Figure 6:
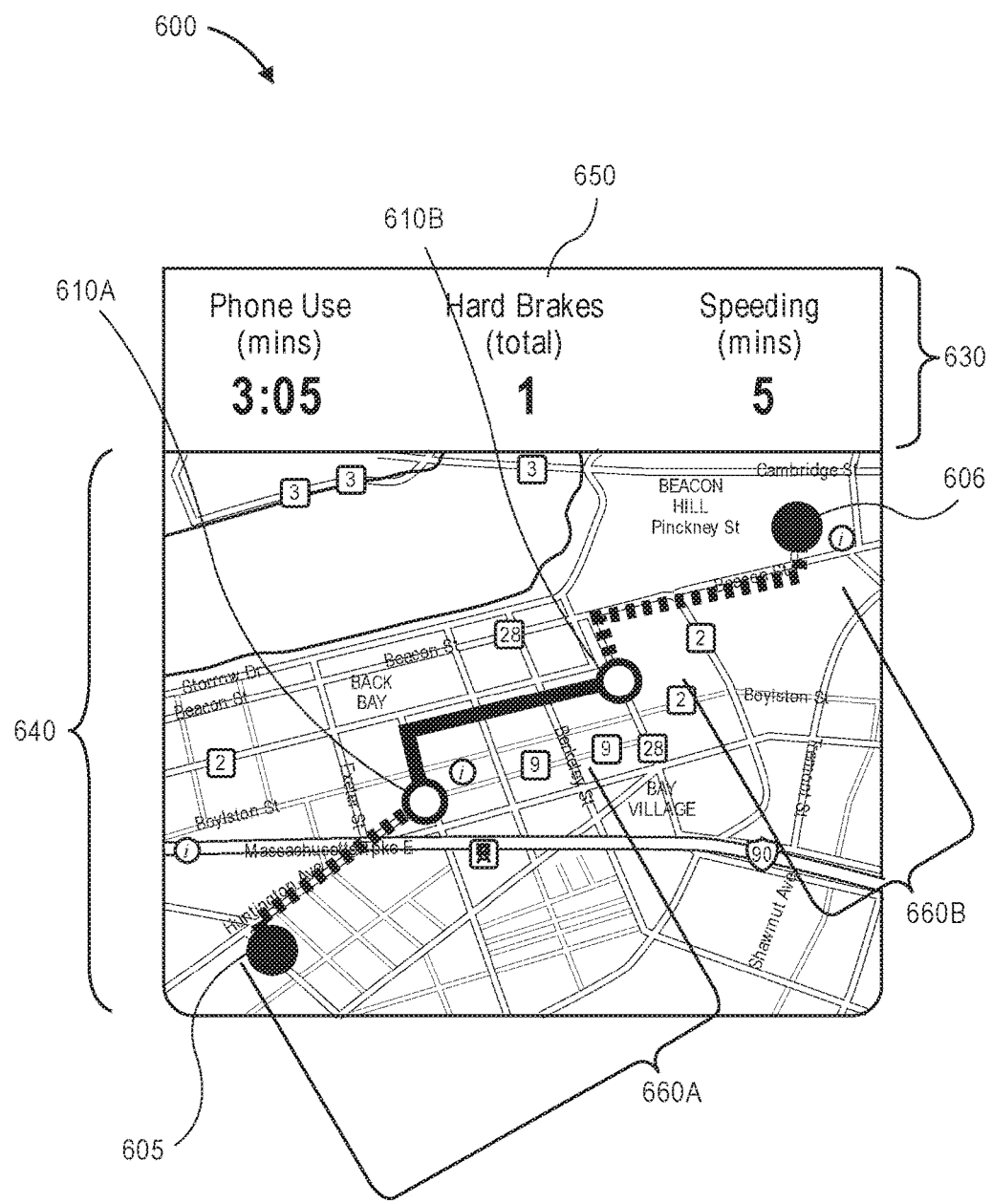
FIG. 6 is a graphical user interface (GUI) illustrating an exemplary drive on a map according to an embodiment of the invention.

FIG. 6 depicts an exemplary drive from points 605 to 606 as shown in an example graphical user interface (GUI) of an application. Illustrating the grouping discussed with FIGS. 4 and 5A-5C above, FIG. 6 shows data collected over a geographic area 640 with a drive starting at 605 and ending at 606. On the depicted drive, potential events 610A and 610B are shown, and groups 660A-660B of points. In some embodiments, groups 660A-660B are created by processed described with FIGS. 4 and 5A-5C above.

In this example, because event 610B is shown outside of a group, only event 610A would be used by an embodiment, e.g., event 610B would not be shown on a GUI as depicted in FIG. 6, and only one "Hard Brake" would be counted in display value 650.

Figure 7:
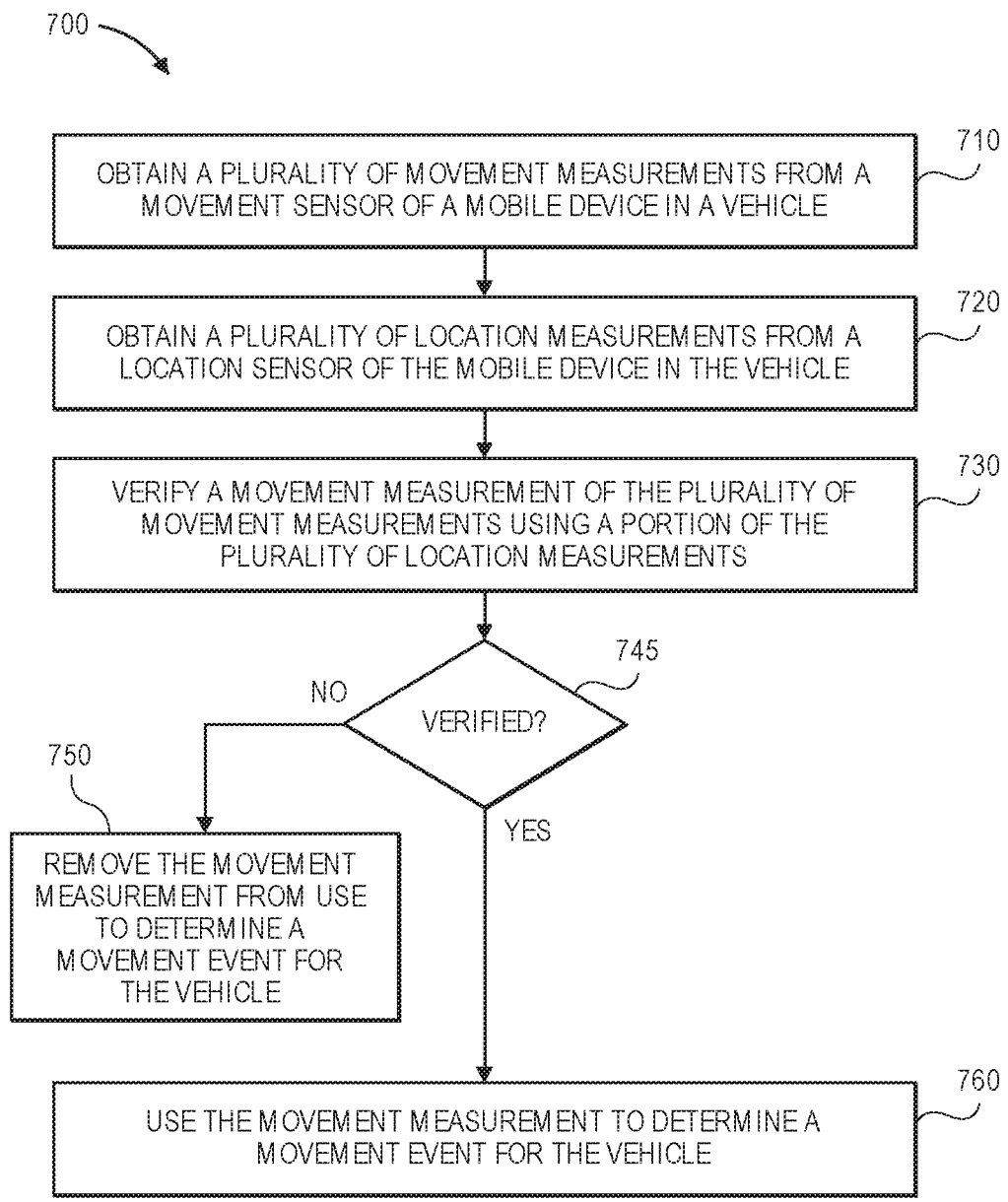
FIG. 7 is a flow chart illustrating a method of analyzing movement measurements according to an embodiment of the invention.

FIG. 7 is a simplified flowchart of the capture, analysis and use of movement measurements associated with a driver, according to an embodiment. The method described in FIG. 7 can use, for example, approaches described herein and in the Incorporated Applications to detect and measure the movement of a moving vehicle.

Method 700 begins as block 710 where a plurality of movement measurements are obtained from a movement sensor of a mobile device in a vehicle. In some embodiments, a plurality of movement measurements (e.g., those shown with time 450A) are obtained from a movement sensor (e.g., accelerometer 112) of a mobile device (e.g., mobile device 101) in a vehicle.

In block 720, a plurality of location measurements are obtained from a location sensor of the mobile device in the vehicle. In some embodiments, a plurality of location measurements is obtained from a location sensor (e.g., data collected by GPS receiver 110) of the mobile device in the vehicle.

In block 730, a movement measurement of the plurality of movement measurements is verified using a portion of the plurality of location measurements. In some embodiments, a movement measurement of the plurality of movement measurements is verified (e.g., by processor 180 performing process 455A) using a portion of the plurality of location measurements.

In block 745, if the movement measurement is not verified, then the movement measurement is removed from use to determine a movement event for the vehicle. In some embodiments, if the movement measurement is not verified (e.g., process 455A at time 450A 20-21), then the movement measurement is removed (e.g., none of groups 490A G1-G6 include values from time 450A 20-21) from use to determine a movement event for the vehicle.

In block 760, when the movement measurement is verified, then the movement measurement is used to determine a movement event for the vehicle. In some embodiments, when the movement measurement is verified (e.g., time 450A 17 has no "X" marks), then the movement measurement is used to determine a movement event for the vehicle (e.g., a braking event is shown for time 450A 17 in group 490A G4).

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method comprising:
    operating a movement sensor of a mobile device disposed in a vehicle to obtain a plurality of movement measurements;
    operating a location sensor of the mobile device disposed in the vehicle to obtain a plurality of location measurements;
    verifying, by a processor of the mobile device, a portion of the plurality of movement measurements using the plurality of location measurements;
    removing, by the processor, one or more movement measurements that are not verified from the plurality of movement measurements to provide a set of remaining movement measurements; and
    determining, by the processor, a movement event for the vehicle using the set of remaining movement measurements.

2. The method of claim 1, further comprising:
    using two or more approaches to verifying the portion of the plurality of movement measurements, wherein verifying using the plurality of location measurements is used by at least one of the approaches,
    wherein removing the one or more movement measurements that are not verified from the portion of the plurality of movement measurements to provide the set of remaining movement measurements comprises, for the plurality of movement measurements, independently using each of the approaches to remove the one or more movement measurements that are not verified.

3. The method of claim 1, wherein verifying the portion of the plurality of movement measurements comprises:
    determining, by the processor, a movement measurement of a first portion of the plurality of movement measurements as not verified based on a comparison of an accuracy estimate of the movement measurement and a first threshold.

4. The method of claim 1, wherein verifying the portion of the plurality of movement measurements comprises:

applying, by the processor, a first set of rules to two movement measurements of a second portion of the plurality of movement measurements to determine that the two movement measurements are not both physically possible; and determining, by the processor, one of the two movement measurements determined to not be physically possible as not verified.

5. The method of claim 1, wherein verifying the portion of the plurality of movement measurements comprises:

determining, by the processor, a third portion of the plurality of movement measurements having duplicate values as not verified.

6. The method of claim 5, wherein the duplicate values of the third portion of the plurality of movement measurements are time values.

7. The method of claim 5, wherein the duplicate values of the third portion of the plurality of movement measurements are location values.

8. The method of claim 1, wherein verifying the portion of the plurality of movement measurements comprises:

applying, by the processor, a second set of rules to a fourth portion of the plurality of movement measurements to determine that each movement measurement of the fourth portion of the plurality of movement measurements has location values that are clustered; and determining, by the processor, the fourth portion of the plurality of movement measurements as not verified.

9. The method of claim 1, further comprising:

grouping each of the set of remaining movement measurements into groups based on a collection time for the set of remaining movement measurements, the grouping resulting in a plurality of movement measurement groups, wherein the set of remaining movement measurements each have a speed component;

for a first group of the plurality of movement measurement groups, using the speed component of each movement measurement of the first group to determine a plurality of acceleration rates describing changes in the speed component;

applying a second threshold to the acceleration rates; and removing two or more movement measurements from the first group based on the second threshold being applied to the acceleration rates associated with the two or more movement measurements.

10. A device comprising:

a memory; and a processor coupled to the memory, wherein the processor is configured to perform operations including:

operating a movement sensor of a mobile device disposed in a vehicle to obtain a plurality of movement measurements;

operating a location sensor of the mobile device disposed in the vehicle to obtain a plurality of location measurements;

verifying a portion of the plurality of movement measurements using the plurality of location measurements;

removing one or more movement measurements that are not verified from the plurality of movement measurements to provide a set of remaining movement measurements; and determining a movement event for the vehicle using the set of remaining movement measurements.

11. The device of claim 10, wherein the processor is further configured to:

use two or more approaches to verifying the portion of the plurality of movement measurements, wherein verifying using the plurality of location measurements is used by at least one of the approaches, wherein removing the one or more movement measurements that are not verified from the plurality of movement measurements to provide the set of remaining movement measurements comprises, for the plurality of movement measurements, independently using each of the approaches to remove the one or more movement measurements that are not verified.

12. The device of claim 10, wherein verifying the portion of the plurality of movement measurements comprises:

determining a movement measurement of a first portion of the plurality of movement measurements as not verified based on a comparison of an accuracy estimate of the movement measurement and a first threshold.

13. The device of claim 10, wherein verifying the portion of the plurality of movement measurements comprises:

applying a first set of rules to two movement measurements of a second portion of the plurality of movement measurements to determine that the two movement measurements are not both physically possible; and determining one of the two movement measurements determined to not be physically possible as not verified.

14. The device of claim 10, wherein verifying the portion of the plurality of movement measurements comprises:

determining a third portion of the plurality of movement measurements having duplicate values as not verified.

15. The device of claim 14, wherein the duplicate values of the third portion of the plurality of movement measurements are time values.

16. The device of claim 14, wherein the duplicate values of the third portion of the plurality of movement measurements are location values.

17. The device of claim 10, wherein verifying the portion of the plurality of movement measurements comprises:

applying a second set of rules to a fourth portion of the plurality of movement measurements to determine that each movement measurement of the fourth portion of the plurality of movement measurements has location values that are clustered; and determining the fourth portion of the plurality of movement measurements as not verified.

18. The device of claim 10, wherein the processor is further configured to:

group each of the set of remaining movement measurements into groups based on a collection time for the set of remaining movement measurements, the grouping resulting in a plurality of movement measurement groups, wherein the set of remaining movement measurements have a speed component;

for a first group of the plurality of movement measurement groups, use the speed component of each movement measurement of the first group to determine a plurality of acceleration rates describing changes in the speed component;

apply a second threshold to the acceleration rates; and remove two or more movement measurements from the first group based on the second threshold being applied to the acceleration rates associated with the two or more movement measurements.

\* \* \* \* \*